US010432299B2

(12) United States Patent
Ravishankar et al.

(10) Patent No.: US 10,432,299 B2
(45) Date of Patent: Oct. 1, 2019

(54) HYBRID SATELLITE SYSTEMS FOR ENHANCED PERFORMANCE AND ENHANCED QUALITY OF SERVICE BROADBAND COMMUNICATIONS

(71) Applicant: Hughes Network Systems, LLC, Germantown, MD (US)

(72) Inventors: Channasandra Ravishankar, Clarksburg, MD (US); George Choquette, Potomac, MD (US); Adrian Morris, Darnestown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 15/481,442

(22) Filed: Apr. 6, 2017

(65) Prior Publication Data

US 2017/0294957 A1    Oct. 12, 2017

Related U.S. Application Data

(60) Provisional application No. 62/319,238, filed on Apr. 6, 2016.

(51) Int. Cl.
*H04W 4/00* (2018.01)
*H04B 7/185* (2006.01)
(Continued)

(52) U.S. Cl.
CPC ..... *H04B 7/18584* (2013.01); *H04B 7/18528* (2013.01); *H04L 12/5692* (2013.01);
(Continued)

(58) Field of Classification Search
CPC ........... H04B 7/18584; H04B 7/18528; H04W 28/085
(Continued)

(56) References Cited

U.S. PATENT DOCUMENTS

| | | | |
|---|---|---|---|
| 2004/0196798 A1* | 10/2004 | Abousleman | H04B 7/185 370/316 |
| 2008/0101446 A1 | 5/2008 | Gautier et al. | |

(Continued)

OTHER PUBLICATIONS

USPTO, "International Search Report & Written Opinion", PCT/US2017/026470, dated Jun. 19, 2017.

*Primary Examiner* — Charles T Shedrick
(74) *Attorney, Agent, or Firm* — Potomac Technology Law, LLC

(57) ABSTRACT

A communications terminal comprises data interface, a transport selection processor and a plurality of communications modems. The data interface receives input data from application sessions for transmission over a data communications network. Each of the application sessions imposes respective transmission requirements for transmission of the data over the data communications network. Each of the communications modems transmits the input data over the data communications network via a respective transmission platform, wherein each transmission platform exhibits respective transmission characteristics based on a transmission technology of the transmission platform. The modems are configured to transmit the input data simultaneously. For each of the application sessions, the transport selection processor selects a one of the modems, for transmission of the input data of the respective application session over the data communications network, based on the respective transmission requirements of the application session and the transmission characteristics of the respective transport platform.

16 Claims, 7 Drawing Sheets

(51) Int. Cl.
　　　*H04W 28/08*　　　(2009.01)
　　　*H04W 40/12*　　　(2009.01)
　　　*H04L 12/54*　　　(2013.01)
　　　*H04W 84/06*　　　(2009.01)

(52) U.S. Cl.
　　　CPC ......... *H04W 28/085* (2013.01); *H04W 40/12* (2013.01); *H04W 84/06* (2013.01)

(58) Field of Classification Search
　　　USPC ....................................................... 455/427
　　　See application file for complete search history.

(56) References Cited

U.S. PATENT DOCUMENTS

| | | |
|---|---|---|
| 2008/0146268 A1 | 6/2008 | Gandhi et al. |
| 2010/0097386 A1 | 4/2010 | Kim et al. |
| 2011/0075605 A1* | 3/2011 | De Pasquale .......... H04B 7/022 370/328 |
| 2011/0080868 A1 | 4/2011 | Krishnaswamy et al. |
| 2013/0310108 A1 | 11/2013 | Altman |

* cited by examiner

HYBRID SATELLITE SYSTEMS FOR ENHANCED PERFORMANCE AND ENHANCED QUALITY OF SERVICE BROADBAND COMMUNICATIONS

RELATED APPLICATIONS

This application claims the earlier filing date under 35 U.S.C. § 119(e) from the provisional patent application Ser. No. 62/319,238 (filed Apr. 6, 2016), the entirety of which is incorporated herein by reference.

BACKGROUND

A number of current factors regarding demand and usage of data communications and communications systems point towards a need for satellite systems serving consumers, enterprises and carriers. This includes evolving user expectations, the changing nature of Internet traffic, the devices by which end users get service, and the available communications technologies.

Consumers in developed nations expect ubiquitous voice and broadband connectivity. Businesses are driven to provide guest Wi-Fi services. Carriers provide Internet access service on commercial aircraft and trains. Satellite broadband expands service coverage to areas without adequate terrestrial capacity. Video streaming demands can only be satisfied by high-throughput spot beam satellite (HTS) systems, with further leverage of Ka-band spectrum, and ultimately, Q and V-bands. These capacity demands need improved modulation and coding schemes that high-performance satellite systems can provide, along with techniques such as interference cancellation and real-time coordination to increase spot beam frequency reuse. Expanded use of aeronautical and terrestrial mobile services leads to further capacity demand. User mobility and expectation of service continuity also drives interoperability between satellite and terrestrial wireless systems, and deployment of VSATs to connect to remote wireless hot spots.

Internet access has also become an economic and social necessity in developing nations, and users are likely to employ the same bandwidth-hungry mobile devices (e.g., smart phones and tablets) as in-place in already developed markets. This will drive demand for increased spectrum availability and broader data communications coverage. Internet traffic changes are affecting both satellite and terrestrial network evolution. Video traffic is growing faster than the available allocated spectrum. Many users are "cutting the cord" and relying on Internet VoIP and video chat in place of traditional land line telephones. "Cloud" storage and backup services are contributing to new upload traffic volume. These changes have spurred development and deployment of 4G and 5G terrestrial technology, and will similarly require more forward and return capacity from HTS systems.

HTTP and HTTPS protocols are now used for software updates, video downloads, video chat, cloud backup uploads and other functions, in addition to interactive Web browsing. Consequently, a simple examination of packet headers to recognize and prioritize interactive traffic is no longer effective for home or business QOS. Forward looking systems must make use of traffic flow monitoring and characterization techniques, such as deep packet inspection to provide adequate differentiated prioritization for conversational, interactive, streaming, and background traffic. Growing use of HTTPS might deter satellite systems from using man-in-the-middle proxy techniques to pre-fetch and cache interactive Web content. Therefore, other methods will be needed to optimize performance for encrypted Web browsing to mitigate the impact of longer delays across GEO satellite links.

Accordingly, there is thus a need for communications system architectures and methods for simultaneous use of multiple available wireless and wireline access technologies, such as high capacity regional GEO systems and broader coverage LEO systems, to provide improved performance to the end-user.

Some Example Embodiments

The present invention advantageously addresses the foregoing requirements and needs, as well as others, by providing communications system architectures and methods for simultaneous use of multiple available wireless and wireline access technologies to provide improved performance to the end-user. According to example, embodiments, the communications client terminal (e.g., a very small aperture terminal (VSAT) for satellite communications) supports multiple wireless and wireline access technologies and includes an access or transport selection module or processor that determines the best access technology or transport platform to be used for a given session based on a number of criterion. Network architectures are provided to allow a VSAT to share the same IP address across multiple access technologies with an transport selection function in the network for forward link traffic. Further, such example embodiments provide for simultaneous delivery and use high capacity regional GEO systems and broader coverage LEO systems, along with satellite backhaul from wireless hot spots established in rural locations, and multi-mission satellites hosting a broadband access payload, direct-to-home video broadcast payload, and other applications sharing the cost of development and launch.

Accordingly, such communications system architectures and methods provide for a better end-user experience in terms of quality, responsiveness and availability. Different applications have different quality of service (QOS) requirements—for example, voice and gaming applications are very delay sensitive, streaming media is jitter sensitive, web browsing is error sensitive and moderately delay sensitive, and e-mail is error sensitive. Accordingly, embodiments of the present invention chose among multiple available access technologies in an optimal manner based on the respective applications to deliver appropriate QOS. Embodiments of the present invention also dynamically determine optimal network routes for different application types, even though the VSAT may only support one radio access technology.

Current systems, by contrast, typically use one radio access technology at a time and manage QOS of different application types on that one radio access technology.

In accordance with example embodiments, a communications terminal comprises a data interface configured to receive input data from one or more application sessions for transmission over a data communications network, wherein each of the one or more application sessions imposes respective transmission requirements for transmission of the data from the application session over the data communications network. The communications terminal further comprises a transport selection processor and a plurality of communications modems. Each of the plurality of communications modems is configured to transmit the input data over the data communications network via a respective transmission platform, wherein each transmission platform exhibits respective transmission characteristics based on a transmission technology of the transmission platform, and wherein the plurality of communications modems are configured to transmit the input data simultaneously. For each of the one or more application sessions, the transport selection processor is configured to select a one of the plurality of modems, for transmission of the input data of the respective application session over the data communications network, based on the respective transmission requirements of the application session and the transmission characteristics of the respective transport platform.

In accordance with further example embodiments a method for transmission of input data from one or more application sessions over a data communications network is provided. The method comprises receiving, by a communications terminal, input data from one or more application sessions for transmission over a data communications network, wherein each of the one or more application sessions imposes respective transmission requirements for transmission of the data from the application session over the data communications network. The method further comprises selecting, for each of the one or more application sessions, a one of a plurality of modems of the communications terminal, for transmission of the input data of the respective application session over the data communications network, wherein each of the plurality of communications modems is associated with a respective transmission platform for transmission of the input data over the data communications network, wherein each transmission platform exhibits respective transmission characteristics based on a transmission technology of the transmission platform, and wherein the plurality of communications modems transmit the input data simultaneously. The selection of the one of the plurality of modems, for each of the one or more application sessions, is based on the respective transmission requirements of the application session and the transmission characteristics of the respective transport platform.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

Example embodiments of the present invention are illustrated by way of example, and not by way of limitation, in the figures of the accompanying drawings, in which like reference numerals refer to similar elements, and in which.

DETAILED DESCRIPTION

Figure 1:
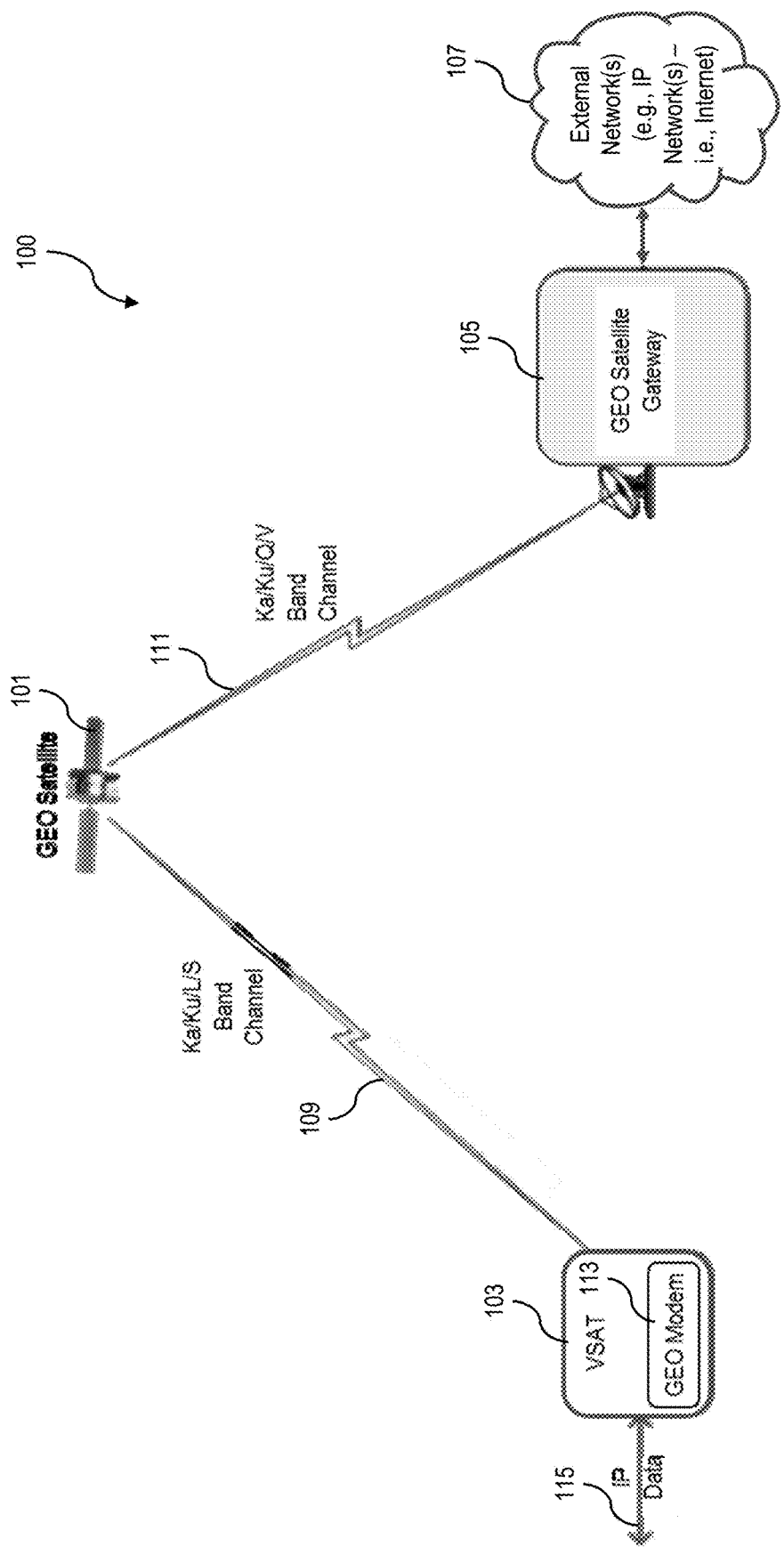
FIG. 1 illustrates a typical prior art geosynchronous Earth orbit (GEO) high throughput satellite (HTS) system.

Communications system architectures and methods for simultaneous use of multiple available wireless and wireline access technologies, such as high capacity regional GEO systems and broader coverage LEO systems, to provide improved performance to the end-user, are provided. According to example embodiments, a variety of satellite solution architectures are provided to address the foregoing changes in communications usage and demands, which solutions are complimentary—for example, regional GEO HTS for maximum capacity density, and a LEO constellation for ubiquitous service coverage. Further, a wireless hot spot might make use of both GEO and LEO technologies for backhaul, using policy-based routing to deliver each application using the most advantageous system.

As will be appreciated, a processor, module or component (as referred to herein) may be composed of software component(s), which are stored in a memory or other computer-readable storage medium, and executed by one or more processors or CPUs of the respective devices. As will also be appreciated, however, a module may alternatively be composed of hardware component(s) or firmware component(s), or a combination of hardware, firmware and/or software components. Further, with respect to the various example embodiments described herein, while certain of the functions are described as being performed by certain components or modules (or combinations thereof), such descriptions are provided as examples and are thus not intended to be limiting. Accordingly, any such functions may be envisioned as being performed by other components or modules (or combinations thereof), without departing from the spirit and general scope of the present invention. Moreover, the methods, processes and approaches described herein may be processor-implemented using processing circuitry that may comprise one or more microprocessors, application specific integrated circuits (ASICs), field programmable gate arrays (FPGAs), or other devices operable to be configured or programmed to implement the systems and/or methods described herein. For implementation on such devices that are operable to execute software instructions, the flow diagrams and methods described herein may be implemented in processor instructions stored in a computer-readable medium, such as executable software stored in a computer memory store.

Further, terminology referring to computer-readable media or computer media or the like as used herein refers to any medium that participates in providing instructions to the processor of a computer or processor module or component for execution. Such a medium may take many forms, including but not limited to non-transitory non-volatile media and volatile media. Non-volatile media include, for example, optical disk media, magnetic disk media or electrical disk media (e.g., solid state disk or SDD). Volatile media include dynamic memory, such random access memory or RAM. Common forms of computer-readable media include, for example, floppy or flexible disk, hard disk, magnetic tape, any other magnetic medium, CD ROM, CDRW, DVD, any other optical medium, random access memory (RAM), programmable read only memory (PROM), erasable PROM, flash EPROM, any other memory chip or cartridge, or any other medium from which a computer can read data.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

FIG. 1 illustrates a typical geosynchronous Earth orbit (GEO) high throughput satellite (HTS) system 100. Such a GEO satellite system delivers higher capacity (several 100 Gigabits/second to 1 Terabit/second) to a geographical region. This capacity trend is similar to the 5G evolution of terrestrial wireless systems from 4G. High-capacity density is achieved using spot beams and a number of advanced signal processing techniques, such as use of power and spectrally efficient DVB-S2X codes, precoding and beam forming, and use of millimeter-wave Q and V bands for gateway feeder links as shown in FIG. 1. The GEO system, for example, comprises a geosynchronous Earth orbit (GEO) satellite 101, a very small aperture terminal (VSAT) 103—which may also be referred to as a user terminal (UT)—and a GEO satellite gateway 105 interfaced with one or more external networks (e.g., IP networks). The VSAT includes a GEO modem 113 for encoding and modulating data for transmission to the GEO satellite based on a respective waveform for the transmission channel to the satellite, and for demodulating and decoding data signals received from the satellite over the satellite channel to recover the original data. Similarly, the GEO gateway also includes one or more GEO modems (not shown) for processing of data to be transmitted to the GEO satellite over the satellite channel and for processing data signals received from the satellite over the satellite channel.

With reference to FIG. 1, by way of example, for user Internet protocol (IP) data destined for a remote external IP network 107 (such as the Internet or a corporate virtual private network (VPN)), a very small aperture terminal (VSAT) (which may also be referred to as a user terminal—UT) receives Internet protocol (IP) data 115 from, for example, user applications running on connected user devices (not shown in the Figure). The IP data may comprise data from various different devices/applications, such as voice over IP (VOIP) data, interactive data, media streaming data, bulk transfer data, Internet browsing data, etc. The VSAT processes the data for transmission, via the GEO satellite, to the GEO satellite gateway. The GEO modem of the VSAT encodes and modulates the data for transmission via carrier signals up to the satellite over the satellite uplink channel 109 (e.g., a Ka, Ku, L or S band channel). The satellite then processes the received carrier signals for transmission of the data to the GEO gateway via the satellite downlink channel 111 (e.g., a Ka, Ku, Q or V band channel). The data transmission from the VSAT to the gateway is referred to as the return link. The GEO gateway then demodulates and decodes the received signals to recover the originally transmitted IP data, and forwards the data to the external IP network(s) for routing to the intended destinations. Similarly, for IP data originating from the remote external IP networks destined for the VSAT, the GEO gateway receives the IP data from the external networks. Here also, the IP data may comprise various different types of data, such as voice over IP (VOIP) data, interactive data, media streaming data, bulk transfer data, Internet browsing data, etc. The GEO gateway processes the data for transmission, via the GEO satellite, to the VSAT. The GEO gateway encodes and modulates the data for transmission via carrier signals up to the satellite over the satellite uplink channel 111 (e.g., a Ka, Ku, Q or V band channel). The satellite then processes the received carrier signals for transmission of the data to the VSAT via the satellite downlink channel 109 (e.g., a Ka, Ku, L or S band channel). The data transmission from the GEO gateway to the VSAT is referred to as the forward link. The VSAT then demodulates and decodes the received signals to recover the originally transmitted IP data, and forwards the data to the appropriate/intended user devices/applications. In such a geosynchronous HTS system, in both the forward and return link directions, the system transmits the data via a single access technology/transmission protocol (the particular channel band used for the uplink and downlink data transmissions).

Figure 2:
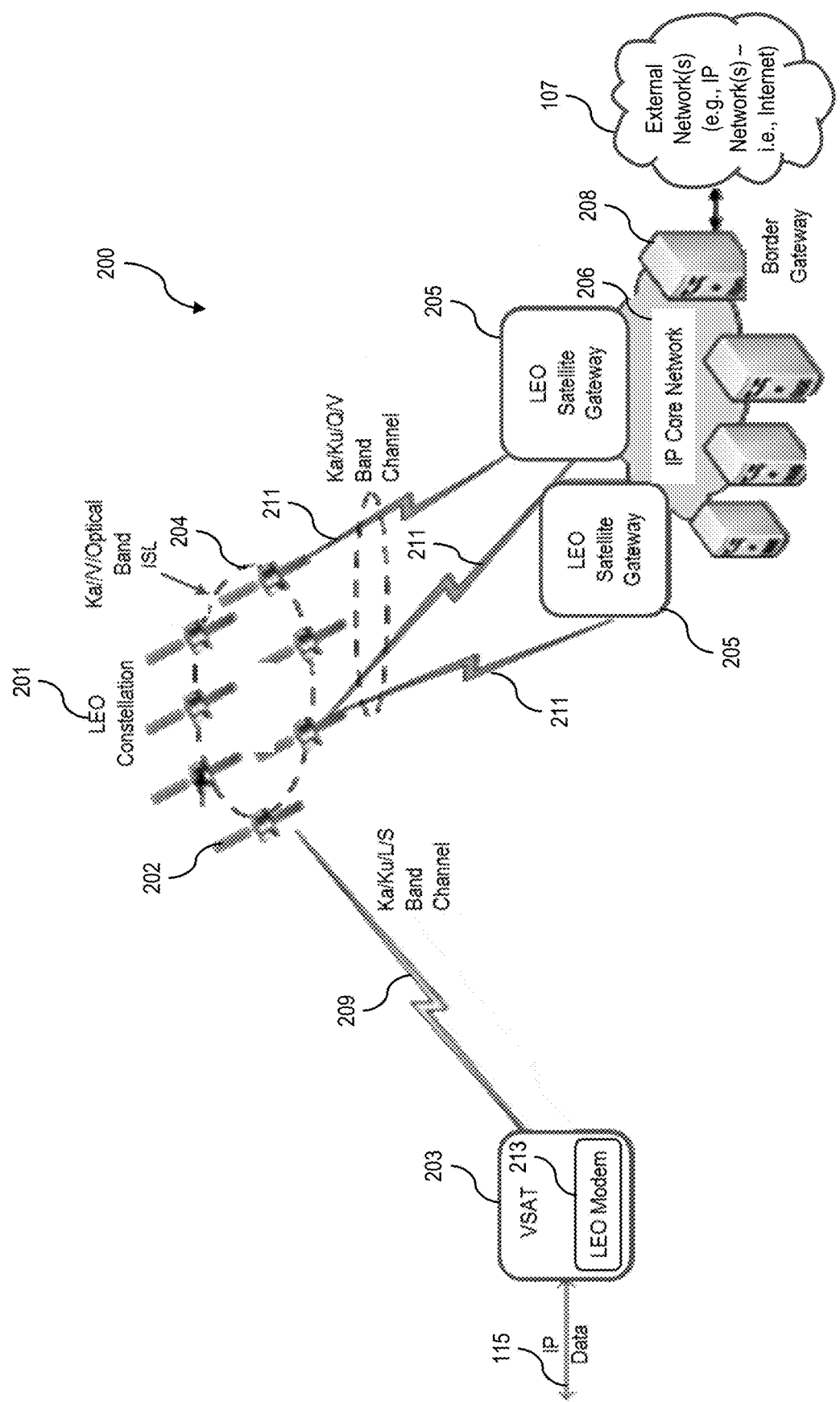
FIG. 2 illustrates a typical prior art low Earth orbit (LEO) satellite system that provides global coverage via a constellation of LEO satellites.

In FIG. 1, the satellite link is carrying all traffic types, namely voice, IP data and signaling. Different applications have different data transmission requirements for adequate or appropriate performance or quality of service (QOS). For example, voice and gaming applications are very delay sensitive, streaming is jitter sensitive, web browsing is error sensitive and moderately delay sensitive, and e-mail is error sensitive. To this end LEO satellite systems can be employed to address traffic for the more delay sensitive applications. FIG. 2 illustrates a typical low Earth orbit (LEO) satellite system 200 that provides global coverage via a constellation of LEO satellites. The LEO system of FIG. 2 comprises a LEO constellation 201 of a plurality of individual low Earth orbit (LEO) satellites 202, a VSAT 203, a plurality of LEO gateways 205, an IP core network 206, and a border gateway 208 interfaced with the one or more external networks 107. The VSAT includes a LEO modem 203 for encoding and modulating data for transmission to a LEO satellite based on a respective waveform for the transmission channel 209 to the satellite, and for demodulating and decoding data signals received from the satellite over the satellite channel 209 to recover the original data. Similarly, each of the LEO gateways also includes one or more LEO modems (not shown) for processing of data to be transmitted to a LEO satellite over a respective satellite channel 211 and for processing data signals received from the satellite over the respective satellite channel 211. The LEO constellation may include inter satellite links (ISLs) 204 for transmission of data signals directly between the satellites, without involving any transmissions to ground terminals or gateways. The ISL channels may utilize a channel band such as KA, V or an optical band.

With reference to FIG. 2, similar to the GEO system, for user Internet protocol (IP) data destined for a remote external IP network (such as the Internet or a corporate virtual private network (VPN)), the VSAT receives IP data 115 from, for example, user applications running on connected user devices (not shown in the Figure). The IP data may comprise data from various different devices/applications, such as voice over IP (VOIP) data, interactive data, media streaming data, bulk transfer data, Internet browsing data, etc. The VSAT processes the data for transmission, via a LEO satellite that currently covers the cell within which the VSAT is located, to a respective LEO satellite gateway. As shown in the Figure, a constellation of LEO satellites may orbit the Earth, where each LEO satellite covers a respective region of the Earth at a given point in time, or during a particular period of time. Further, at any particular point in time or during a particular period of time, each LEO satellite may be in contact with a particular LEO satellite gateway within the view of the LEO satellite at that time. The LEO modem of the VSAT encodes and modulates the data for transmission via carrier signals up to the satellite over the satellite uplink channel, which may be a Ka, Ku, L or S band channel. The satellite then processes the received carrier signals for transmission of the data to the respective LEO gateway via the satellite downlink channels, which may be a Ka, Ku, Q or V band channel. The data transmission from the VSAT to the gateway again is referred to as the return link. The LEO gateway then demodulates and decodes the received signals to recover the originally transmitted IP data, and forwards the data to the external IP networks (e.g., the Internet) for routing to the intended destinations. Similarly, for IP data originating from the remote external IP networks destined for the VSAT, the respective LEO gateway receives the IP data from the external networks. Here again the IP data may comprise various different types of data, such as voice over IP (VOIP) data, interactive data, media streaming data, bulk transfer data, Internet browsing data, etc. The LEO gateway processes the data for transmission, via the LEO satellite that covers the cell within which the LEO gateway is located, to the VSAT. The LEO gateway encodes and modulates the data for transmission via carrier signals up to the satellite over the satellite uplink channel, which may be a Ka, Ku, Q or V band channel. The LEO satellite then processes the received carrier signals for transmission of the data to the VSAT via the satellite downlink channels, which may be a Ka, Ku, L or S band channel. The data transmission from the LEO gateway to the VSAT is again referred to as the forward link. The VSAT then demodulates and decodes the received signals to recover the originally transmitted IP data, and forwards the data to the appropriate/ intended user devices/applications. As with the geosynchronous HTS system, in such a LEO satellite system, in both the forward and return link directions, the system transmits the data via a single access technology/transmission protocol (the particular channel band used for the uplink and downlink data transmissions).

In the case of the LEO satellite system, even though the VSAT is fixed, beams and satellites move with respect to the UT/VSAT and the LEO gateways, thereby requiring frequent handovers. For example, while a VSAT is transmitting IP data to a particular LEO satellite, the satellite may move out of range from the VSAT (no longer covering the cell within which the VSAT is located) and a new LEO satellite may move into range of the VSAT—the VSAT transmissions would then be handed over (switched) to the new LEO satellite, and the new LEO satellite would connect to and continue the data transmissions down to the respective LEO gateway. Tracking antennas are thus required at the VSAT and gateways to achieve throughputs comparable to that obtained in GEO satellite systems. In spite of the complexities of this architecture, the architecture provides for the advantage of low latency (as the LEO satellites travel in an orbit much closer to the Earth as compared to a Geo satellite. Further, the network architecture for the LEO system shown in FIG. 2 can accommodate user (i.e., subscriber identity module—SIM) mobility in addition to terminal mobility. This is possible with the use of a standard terrestrial core network architecture behind the satellite gateways. Satellite gateways are connected via 3 options: terrestrial links, a LEO satellite constellation, or a GEO satellite system. In FIG. 2 a border gateway plays the role of the Packet Data Network Gateway (PGW) of the 4G Long Term Evolution (LTE) core network. Beyond 2020, this core network will likely resemble the prevailing 5G core network.

The throughput delivered by individual LEO satellites, however, may be limited based on satellite capabilities and number of users sharing the user link spectrum. This is especially true given the widespread use of video streaming where very high throughputs are desired in forward link. Given that streaming video itself is not as sensitive to delay, it may be desirable to use GEO satellite transports for delay insensitive traffic.

Figure 3:
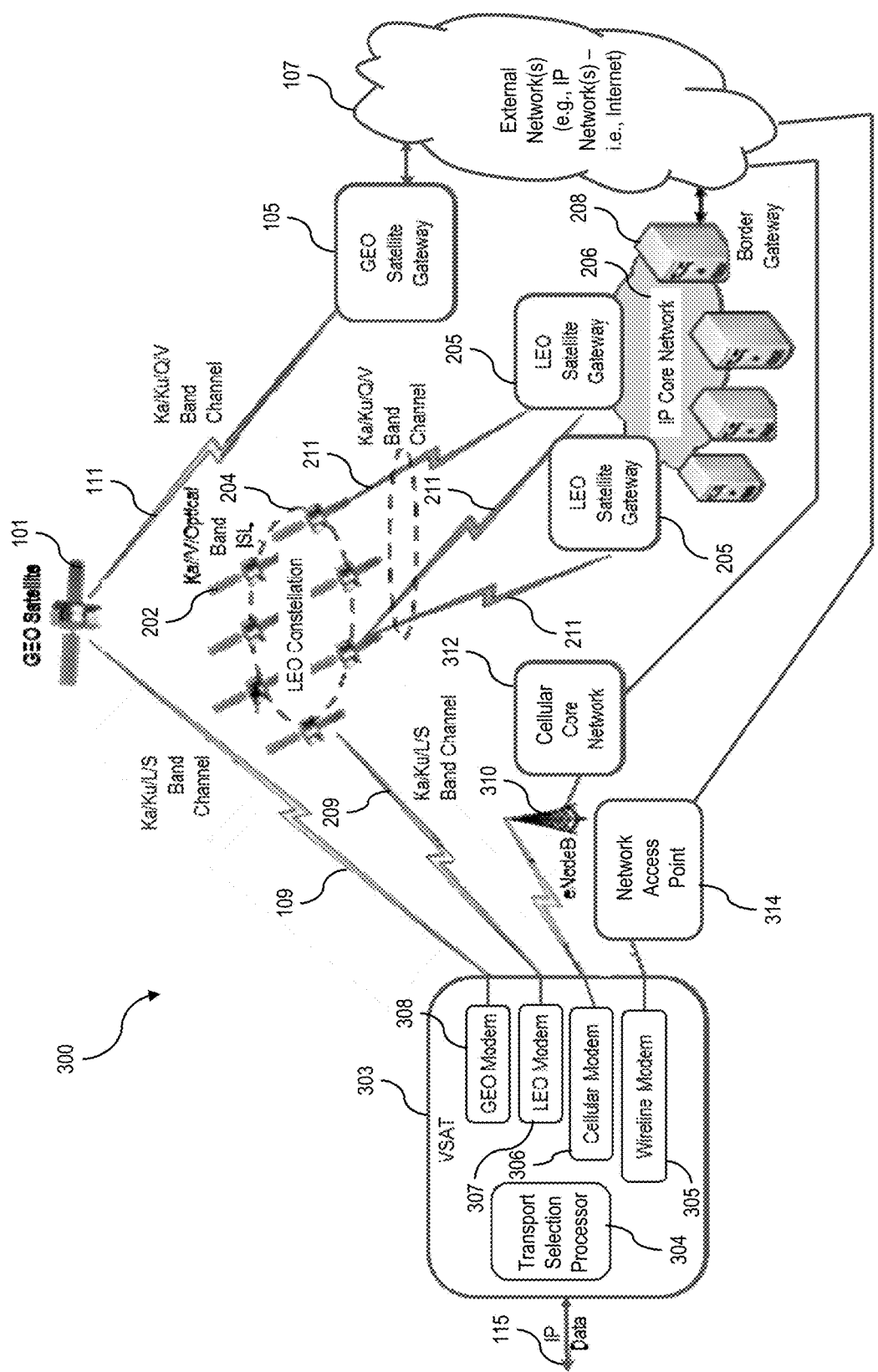
FIG. 3 illustrates a data communications system where a VSAT is configured to utilize multiple access/transmission technologies in parallel, in accordance with example embodiments of the present invention.

FIG. 3 illustrates a data communications system 300 where a VSAT 303 is configured to utilize multiple access/ transmission technologies in parallel, in accordance with example embodiments of the present invention. With reference to FIG. 3, the VSAT comprises a transport selection processor 304 or access selection function, a GEO modem 308, a LEO modem 307, a cellular modem 306 and a wireline modem 305. Each of the different modems provides access to a respective transmission technology or platform for transmission of the received user application data (e.g., IP data received from various user devices/user applications—such as interactive data, VOIP data, bulk traffic, Internet browsing traffic, streaming media, etc.). Further, the VSAT may include any combination of additional or fewer transmission platform access devices than as shown in the figure without departing from the scope of the present invention. By way of example, as with the GEO system of FIG. 1, the GEO modem 308 of the VSAT provides access to the transmission path to the GEO satellite gateway and the external networks, via the uplink and downlink channels 109, 111 over the GEO satellite. By way of further example, as with the LEO system of FIG. 2, the LEO modem 307 provides access to the transmission path to the a respective one of the LEO satellite gateways and the external networks, via the uplink and downlink channels 209, 211 over the constellation of LEO satellites 202. By way of further example, the cellular modem 306 provides for a cellular transmission path, via the eNodeB 310 and respective cellular channels currently serving the cell within which the VSAT is located, to the cellular core network 312 and the external networks 107. By way of further example, the wireline modem 305 provides access to external networks 107 via a network access point or node 314, such as a service provider (e.g., an Internet service provider or ISP) node or data center, where the transmission path is provided over a series of wired links (e.g., fiber, cable, copper telephone lines, T1, etc. or any combination thereof), connected through a series of routers forming the overall network (e.g., the Internet).

Accordingly, as shown in FIG. 3, the VSAT has access to the multiple access technologies, GEO, LEO, terrestrial wireless and wireline technologies. As such, the VSAT may transmit data via all of the available transport technologies in parallel, or any sub-combination thereof, at any given time. In accordance with example embodiments, the access selection processor or access selection function (ASF) is configured to determine the access technology to be used to perform the data transmission of each currently active application data session or communications session. According to such example embodiments, the ASF is configured to select an access technology for transmission of the data of a given user application or service based on a series of factors, such as the application/service type, the availability of the transport or access technologies, an estimated throughput of each available access technology, the latency or transmission delay of each available access technology, the transmission reliability of each of the available access technologies, and the associated cost of each of the available access technologies. The selection of the access technology is further based on which access technologies are available to the VSAT at the time of the selection. This is due to the fact that, at a given point in time, a VSAT may not have all configured access technologies available to it for data transmission—for example, a mobile VSAT will not have a wireline access technology available, or in a heavy rain scenario, a Ka band GEO satellite link may be unavailable or severely degraded, or a particular transport platform may be in a blackout situation due to equipment failure, a downed cable line or equipment maintenance). Further, the access technology that is used may also depend on interference scenarios where the VSAT may be required to turn off one of the access technologies to meet regulatory requirements in terms of emitted power flux density.

According to one such embodiment, the access selection function/processor will chose the appropriate transmission platform for a particular application or service data session based on quality of service or other transmission requirements of the application or service. For example, VOIP session data is generally susceptible to latency or transmission delay, and thus the ASF may choose the cellular or wireline transport for transmission of VOIP session data. Similarly, media streaming session data is susceptible to jitter, and some streaming sessions (such as HD video) require high data throughput, and thus the ASF may choose the high throughput GEO transport for transmission of HD video streaming session data. According to a further embodiment, therefore, the VSAT may also include a traffic classifier configured to classify the traffic of the incoming application or service data session streams. For example, the traffic or data classifier may be configured to classify the packets of each data or session flow based on respective requirements and characteristics of the different data flows. The ASF would then choose the appropriate data transport platform or access technology based on the classification assigned to each received data packet. The data packets of a particular classification (regardless of whether they are of the same application or service session) would be transmitted over the same transport platform, and the individual flows of the respective data sessions would get reassembled at the destination gateway or router node, based on the header data of the individual data packets.

Further, according to the embodiment of FIG. 3, each transport platform of the VSAT is assigned an individual IP address to identify the particular source VSAT/transport the return link data packets originated from, and to identify the target VSAT and transport platform to which the forward link data packets are destined. With regard to the forward link, the data packets will be routed from the respective external network to the appropriate transport platform gateway or access modem/router based on the IP address of the VSAT for that transport platform. The VSAT is thus assigned as many IP addresses as the number of access technologies that it is configured to use. The VSAT can then be authenticated by the individual access technology operators or providers based on the respective IP address of the VSAT/transport. This, however, is not always desirable since the end-user will be required to manage multiple IP addresses and perhaps associated accounts. Additionally, if the wireless access methodologies are based on terrestrial wireless technologies, then the VSAT may also require as many SIM cards.

Figure 4:
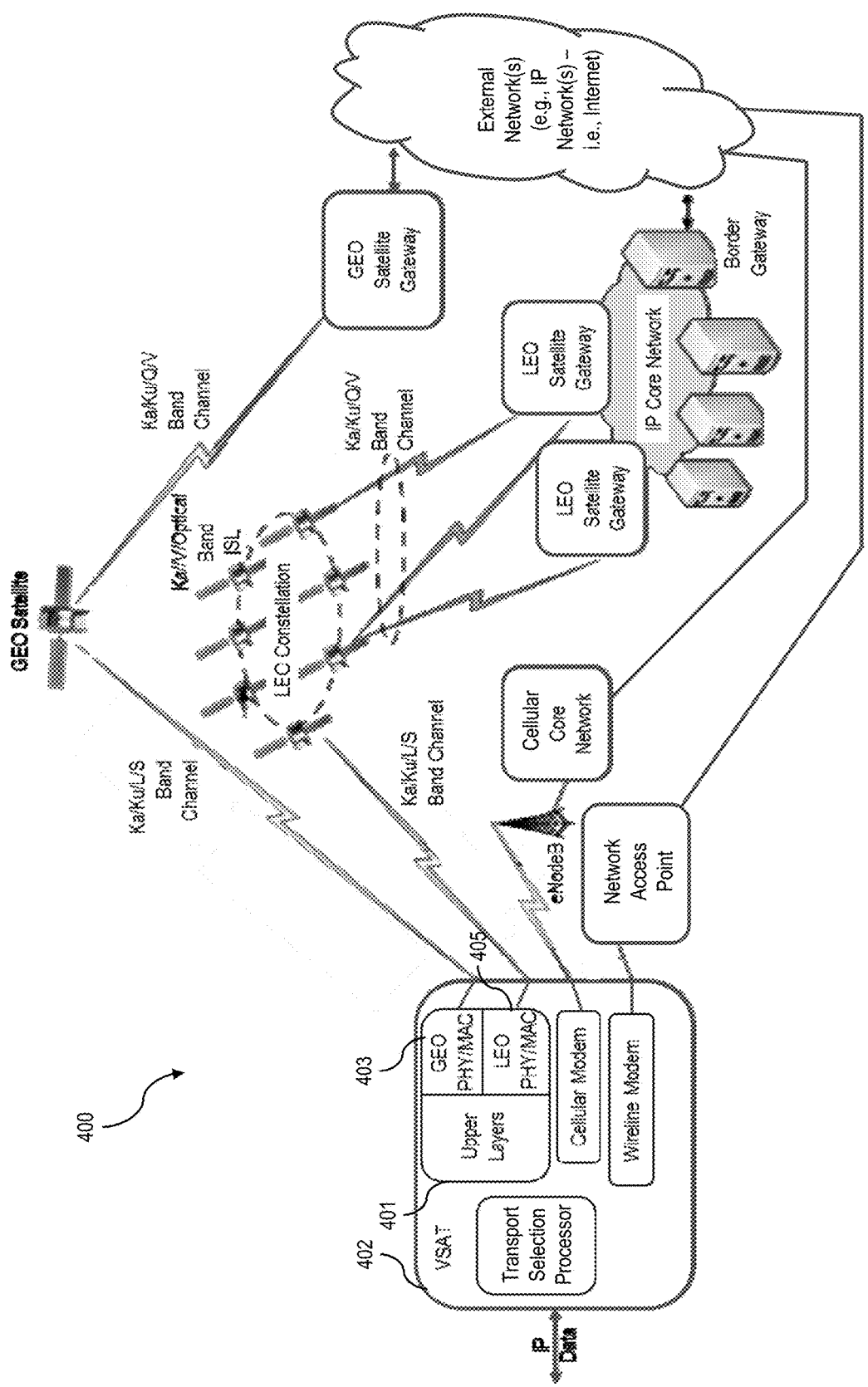
FIG. 4 illustrates a data communications system where a VSAT is configured to utilize multiple access/transmission technologies in parallel, and where the GEO and LEO satellite systems share a common core network and the VSAT is thereby able to use a single common IP address for both the LEO and GEO transport platforms, in accordance with example embodiments of the present invention.
Figure 5:
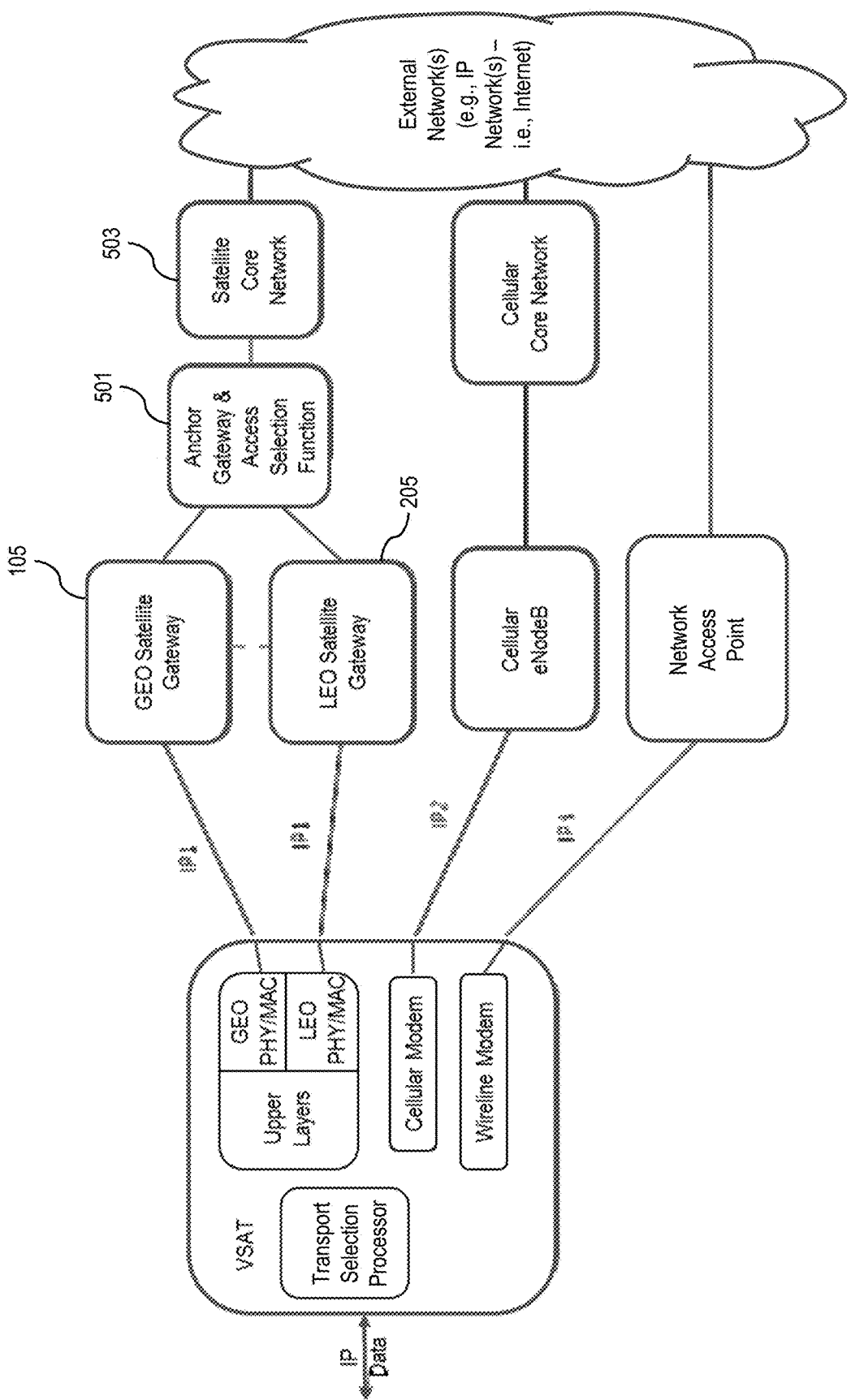
FIG. 5 illustrates the network connectivity for the architecture of the system of FIG. 4, including the anchor gateway between the LEO and GEO satellite gateways and the satellite core network, in accordance with example embodiments of the present invention.

FIG. 4 illustrates a data communications system 400 where the VSAT 402 is configured to utilize multiple access/transmission technologies in parallel, and where the GEO and LEO satellite systems share a common core network and the VSAT is thereby able to use a single common IP address for both the LEO and GEO transport platforms, in accordance with example embodiments of the present invention. By way of example, assuming a 4G LTE core network, the packet data network (PDN) gateway (PGW) will assign a single IP address to the VSAT regardless of whether the access is via GEO or LEO satellite. Further, in such embodiments, the VSAT may include or use a common upper layer stack 401 that interfaces with the individual LEO physical (PHY) and media access control (MAC) layers 405 and GEO physical (PHY) and media access control (MAC) layers 403 that function as the respective LEO and GEO modem interfaces for the respective LEO/GEO satellite channels. In such embodiments, the ASF of the VSAT will, however, still determine the bearers to be established on the individual links. Further, on the network side, a common anchor gateway 501 (e.g., common to the GEO and LEO transport systems) provides the interface between the individual LEO and GEO satellite gateways 205, 105 and the common satellite core network 503 (e.g., a standard terrestrial 4G LTE core network)—shared between the LEO and GEO transport systems. With such an architecture, the anchor gateway would also have an access selection processor or function to determine the appropriate satellite transport (e.g., the LEO or the GEO) for the packets having the common satellite transport IP address as the VSAT destination IP address. By way of example, the anchor gateway ASF may select the LEO transport for dedicated bearers that are established for delay sensitive traffic, and the GEO transport for dedicated bearers that are established for delay insensitive traffic. FIG. 5 illustrates the network connectivity for the architecture of the system of FIG. 4, including the anchor gateway 501 between the LEO and GEO satellite gateways 205, 105 and the satellite core network 503, in accordance with example embodiments of the present invention.

According to such example embodiments, such broadband satellite systems may also leverage emerging technologies for onboard processing, software-defined networking, affordable tracking antennas, and the use of higher radio frequency and optical bands to further augment coverage, utilization, and capacity. Building upon current HTS system deployments, which are typically in geosynchronous orbits with transponded payloads, such systems may selectively utilize digital transponders, onboard switching, and inter-constellation links across geosynchronous earth orbit (GEO), medium earth orbit (MEO), and low earth orbit (LEO) orbits. Onboard switching would improve dynamic utilization of aggregate satellite capacity by adapting individual uplink, downlink, and inter-satellite link capacities commensurate with the expected spatially and temporally varying traffic load. Whether operating over transponded or regenerative payloads, a unifying packet networking architecture would provide an overall framework for transporting converged user traffic across various source and destination points covering a large geographical area. Further, associated dynamic addressing, routing, and traffic engineering techniques selectively supported by switched satellite payloads would yield a resilient, IP-based network fabric offering transport services with defined end-to-end QOS.

Figure 6:
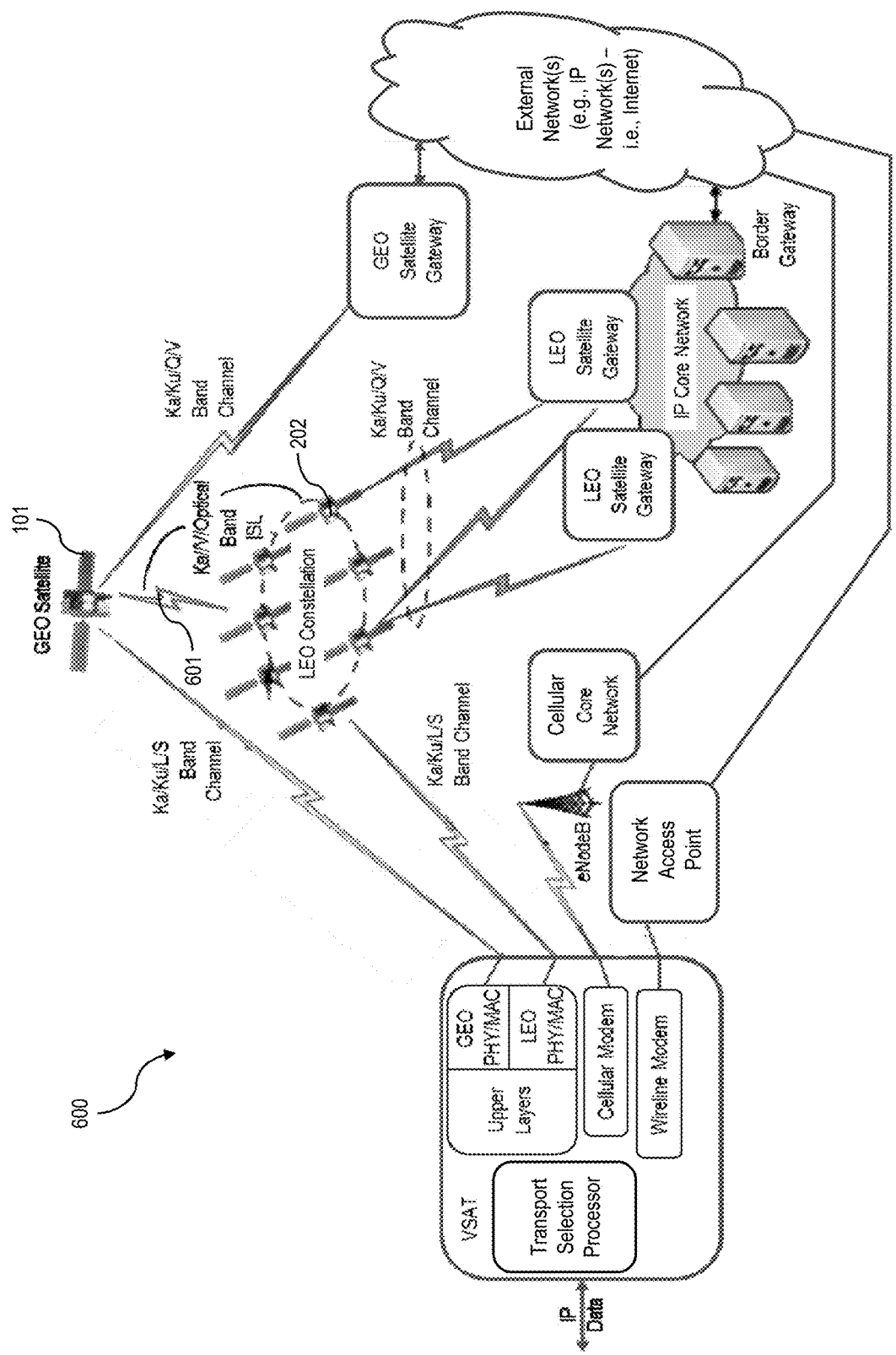
FIG. 6 illustrates a similar system architecture to that of FIG. 4, which further includes LEO-GEO cross links for transmission of data directly between the GEO satellite and the LEO satellites, in accordance with example embodiments of the present invention.

According to such embodiments, for example, the inter-satellite links amongst the satellites of a LEO constellation provide direct cross connectivity between different satellites of the same constellation and orbit. According to further embodiments, FIG. 6 illustrates a similar system architecture to that of FIG. 4, which further includes inter-orbit (e.g., LEO-GEO) inter-satellite cross links 601 for transmission of data directly between a GEO satellite 101 and the LEO satellites 202 of a low Earth orbit constellation. According to such embodiments, for various different reasons, a routing decision may be made to switch traffic being carried over a LEO transport to a GEO transport, or vice versa. Further, according to such embodiments, for security reasons, it may be a requirement to land traffic at one or more specific locations on the ground without traversing any ground-based communications infrastructure between the source and the ultimate destination(s). In that context, with the architecture shown in FIG. 6, data may be securely transmitted from one LEO satellite to another LEO satellite within the constellation—and the data may further be securely transmitted from a LEO satellite, via a LEO-GEO inter-satellite link 601, to the GEO satellite, at a time when the LEO satellite is within the range of the respective GEO inter-satellite link—where all such transmissions are made in space, without traversing any ground-based communications infrastructure. The data may then be delivered to one or more ground destinations from the respective LEO/GEO satellites.

Figure 7:
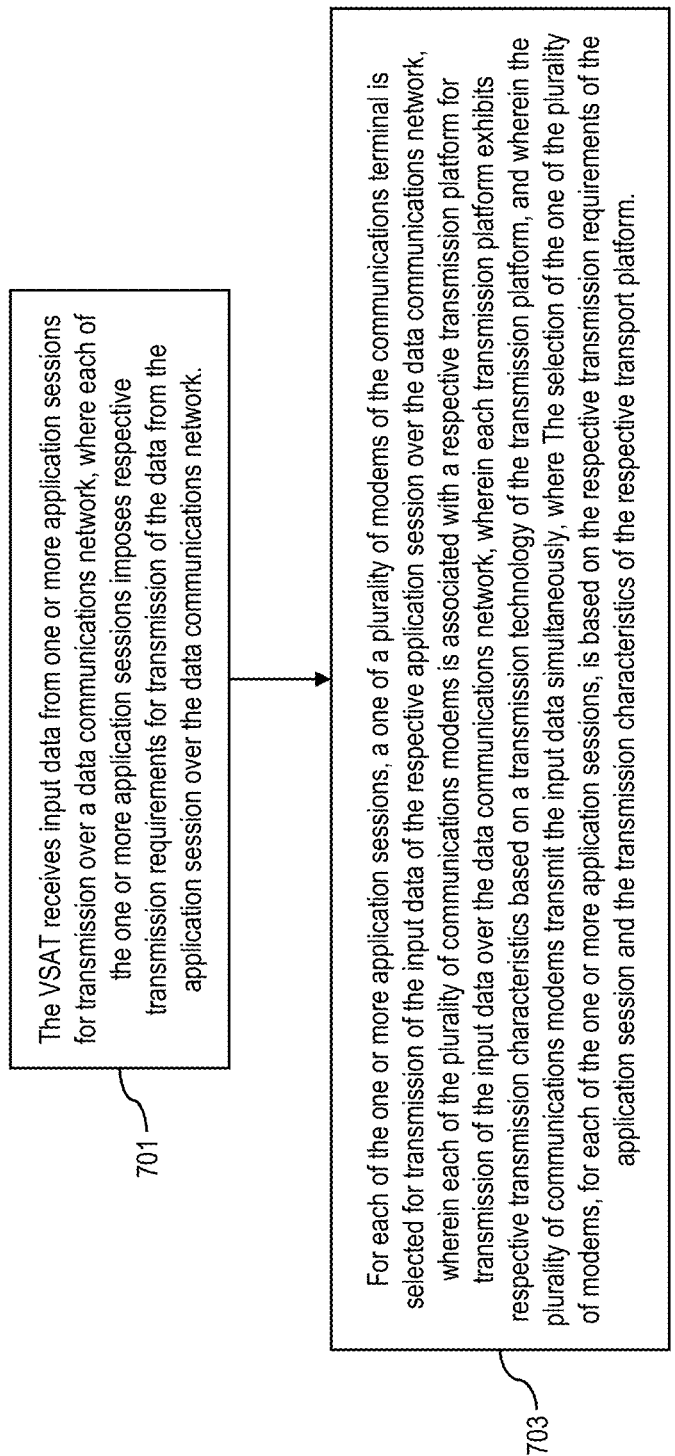
FIG. 7 illustrates a method for transmission of input data from one or more application sessions over a data communications network, in accordance with example embodiments of the present invention.

FIG. 7 illustrates a method for transmission of input data from one or more application sessions over a data communications network, in accordance with example embodiments of the present invention. In step S701, the VSAT receives input data from one or more application sessions for transmission over a data communications network, where each of the one or more application sessions imposes respective transmission requirements for transmission of the data from the application session over the data communications network. In step S703, for each of the one or more application sessions, a one of a plurality of modems of the communications terminal is selected for transmission of the input data of the respective application session over the data communications network, wherein each of the plurality of communications modems is associated with a respective transmission platform for transmission of the input data over the data communications network, wherein each transmission platform exhibits respective transmission characteristics based on a transmission technology of the transmission platform, and wherein the plurality of communications modems transmit the input data simultaneously. The selection of the one of the plurality of modems, for each of the one or more application sessions, is based on the respective transmission requirements of the application session and the transmission characteristics of the respective transport platform.

While example embodiments of the present invention may provide for various implementations (e.g., including hardware, firmware and/or software components), and, unless stated otherwise, all functions are performed by a CPU or a processor executing computer executable program code stored in a non-transitory memory or computer-readable storage medium, the various components can be implemented in different configurations of hardware, firmware, software, and/or a combination thereof. Except as otherwise disclosed herein, the various components shown in outline or in block form in the figures are individually well known and their internal construction and operation are not critical either to the making or using of this invention or to a description of the best mode thereof.

In the preceding specification, various embodiments have been described with reference to the accompanying drawings. It will, however, be evident that various modifications may be made thereto, and additional embodiments may be implemented, without departing from the broader scope of the invention. The specification and drawings are accordingly to be regarded in an illustrative rather than restrictive sense.

What is claimed is:

1. A communications terminal comprising:
a data interface configured to receive input data from a plurality of application sessions for transmission of the input data of each application session to a respective destination device, wherein each of the application sessions induces one or more respective transmission requirements for the transmission of the data from the application session to the respective destination device;
a transport selection processor; and
a plurality of modems; and
wherein each of the plurality of modems is configured to transmit the input data via a respective transmission platform, wherein, for at least two of the modems, each of the respective transmission platforms comprises a different transport or transmission technology that exhibits respective transmission characteristics, and wherein the plurality of modems are configured to transmit the input data simultaneously,
wherein, for each of the application sessions, the transport selection processor is configured to select a one of the plurality of modems, for transmission of the input data of the application session to the respective destination device, based on the respective transmission requirements of the application session and the transmission characteristics of the respective transmission platform, and wherein, for each of at least two of the application sessions, the transport selection processor is configured to select a different one of the at least two modems for which the respective transmission platforms comprise the different transport or transmission technologies,
wherein the respective transmission platforms of the respective modems selected for the at least two of the application sessions share a common anchor gateway that provides an interface between the respective transmission platforms of the respective modems selected for the at least two of the application sessions and a common core network, and
wherein, via the common anchor gateway, a common source or destination address is used for data communications between the communications terminal and the anchor gateway over the respective transmission platforms of the respective modems selected for the at least two of the application sessions.

2. A method comprising:
receiving, by a communications terminal, input data from a plurality of application sessions for transmission of the input data of each application session to a respective destination device, wherein each of the application sessions induces one or more respective transmission requirements for the transmission of the data from the application session to the respective destination device; and
selecting, for each of the application sessions, a one of a plurality of modems of the communications terminal, for transmission of the input data of the application session to the respective destination device, wherein each of the plurality of modems is associated with a respective transmission platform for transmission of the input data, wherein, for at least two of the modems, each of the respective transmission platforms comprises a different transport or transmission technology that exhibits respective transmission characteristics, and wherein the plurality of modems transmit the input data simultaneously; and
wherein the selection of the one of the plurality of modems, for each of the application sessions, is based on the respective transmission requirements of the application session and the transmission characteristics of the respective transmission platform, and wherein, for each of at least two of the application sessions, the selection of the one of the plurality of modems comprises selection a different one of the at least two modems for which the respective transmission platforms comprise the different transport or transmission technologies, and
wherein the respective transmission platforms of the respective modems selected for the at least two of the application sessions share a common anchor gateway that provides an interface between the respective transmission platforms of the respective modems selected for the at least two of the application sessions and a common core network, and
wherein, via the common anchor gateway, a common source or destination address is used for data communications between the communications terminal and the anchor gateway over the respective transmission platforms of the respective modems selected for the at least two of the application sessions.

3. The communications terminal according to claim 1, wherein the transmission requirements comprise one or more of transmission latency, jitter, throughput and reliability.

4. The communications terminal according to claim 1, wherein the transmission characteristics of each transmission platform are based on one or more of the respective transport or transmission technology of the transmission platform, a service type of the transmission platform, one or more operating conditions of the transmission platform and business conditions associated with the transmission platform.

5. The communications terminal according to claim 1, wherein the transmission characteristics of each transmission platform comprise one or more of an availability of the transmission platform, a throughput of the transmission platform, transmission latency of the transmission platform, a transmission reliability of the transmission platform and an associated cost of the transmission platform.

6. The communications terminal according to claim 1, wherein each transmission platform via which the terminal transmits application session data is assigned a respective network address to identify the communications terminal and the transmission platform that comprise a source of the application session data transmitted via that transmission platform.

7. The communications terminal according to claim 1, wherein the terminal is configured to disable one or more of the modems based on regulatory requirements.

8. The communications terminal according to claim 1, wherein the selection of the one of the plurality of modems, for each of the application sessions, is further based on an availability of each of the respective transmission platforms.

9. The communications terminal according to claim 1, further comprising:
a traffic classification processor configured to classify the input data, wherein the selection of the one of the plurality of modems, for each of the application sessions, is further based on the classification of the input data of the respective application session.

10. The method according to claim 2, wherein the transmission requirements comprise one or more of transmission latency, jitter, throughput and reliability.

11. The method according to claim 2, wherein the transmission characteristics of each transmission platform are based on one or more of the respective transport or transmission technology of the transmission platform, a service type of the transmission platform, one or more operating conditions of the transmission platform and business conditions associated with the transmission platform.

12. The method according to claim 2, wherein the transmission characteristics of each transmission platform comprise one or more of an availability of the transmission platform, a throughput of the transmission platform, transmission latency of the transmission platform, a transmission reliability of the transmission platform and an associated cost of the transmission platform.

13. The method according to claim 2, wherein each transmission platform is assigned a respective network address to identify the communications terminal and the transmission platform that comprise a source of the application session data transmitted via that transmission platform.

14. The method according to claim 2, further comprising:
disabling one or more of the modems based on regulatory requirements.

15. The method according to claim 2, wherein the selection of the one of the plurality of modems, for each of the application sessions, is further based on an availability of each of the respective transmission platforms.

16. The method according to claim 2, further comprising:
classifying the input data, wherein the selection of the one of the plurality of modems, for each of the application sessions, is further based on the classification of the input data of the respective application session.

* * * * *